United States Patent
Fonseca et al.

(10) Patent No.: US 11,158,998 B1
(45) Date of Patent: Oct. 26, 2021

(54) HEAT SINK FOR POWER SUPPLY PANEL

(71) Applicant: ABB Schweiz AG, Baden (CH)

(72) Inventors: Shawn Fonseca, Newington, CT (US); Daniel Edward Delfino, Farmington, CT (US)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/858,898

(22) Filed: Apr. 27, 2020

(51) Int. Cl.
| | |
|---|---|
| *H02B 1/56* | (2006.01) |
| *H02B 1/20* | (2006.01) |
| *H01R 25/16* | (2006.01) |
| *H02B 1/48* | (2006.01) |
| *H02B 1/24* | (2006.01) |

(52) U.S. Cl.
CPC .............. *H02B 1/56* (2013.01); *H01R 25/161* (2013.01); *H02B 1/20* (2013.01); *H02B 1/24* (2013.01); *H02B 1/48* (2013.01)

(58) Field of Classification Search
None
See application file for complete search history.

(56) References Cited

U.S. PATENT DOCUMENTS

| | | | | |
|---|---|---|---|---|
| 5,552,636 A * | 9/1996 | Darveaux | ............... | H01L 23/32 257/709 |
| 6,636,401 B1 * | 10/2003 | Meiners | .................. | H02B 1/21 361/115 |
| 8,339,773 B2 * | 12/2012 | Frassineti | ................ | H02B 1/56 361/677 |
| 9,780,538 B2 * | 10/2017 | Lee | ........................... | H02B 1/20 |
| 10,292,310 B2 * | 5/2019 | Maloney | .................. | H02G 3/14 |
| 2010/0304590 A1 * | 12/2010 | Frassineti | ................ | H01H 9/52 439/196 |
| 2012/0206881 A1 * | 8/2012 | Nelson | ............... | H05K 7/20681 361/709 |
| 2013/0306342 A1 * | 11/2013 | Karandikar | .......... | H02B 13/025 174/50 |
| 2014/0091617 A1 * | 4/2014 | Horowy | ................... | H01H 9/52 307/9.1 |
| 2014/0315401 A1 * | 10/2014 | Blasbalg | .................. | H02B 1/21 439/110 |
| 2016/0104986 A1 * | 4/2016 | Sheridan | .............. | H01R 25/162 439/213 |
| 2016/0233650 A1 * | 8/2016 | Baillargeon | ............. | H02B 3/00 |
| 2017/0295672 A1 * | 10/2017 | Pal | ...................... | H05K 7/20409 |
| 2018/0158753 A1 | 6/2018 | Iwai et al. | | |
| 2019/0393640 A1 | 12/2019 | Steinberger et al. | | |

\* cited by examiner

*Primary Examiner* — Courtney L Smith (74) *Attorney, Agent, or Firm* — Greenberg Traurig, LLP (57) ABSTRACT

A heat sink is described for cooling an electrical component. The heat sink has heat dissipating structures connected to a base. The base is attached to a connector which makes contact with a heat transfer contact of the electrical component. The electrical component may be a power supply bus which supplies electrical current to a series of circuit breakers.

23 Claims, 6 Drawing Sheets

HEAT SINK FOR POWER SUPPLY PANEL

BACKGROUND

The present inventions relate generally to a heat sink, and more particularly, to a heat sink that may be connected to an electrical component with a connector.

Figure 1:
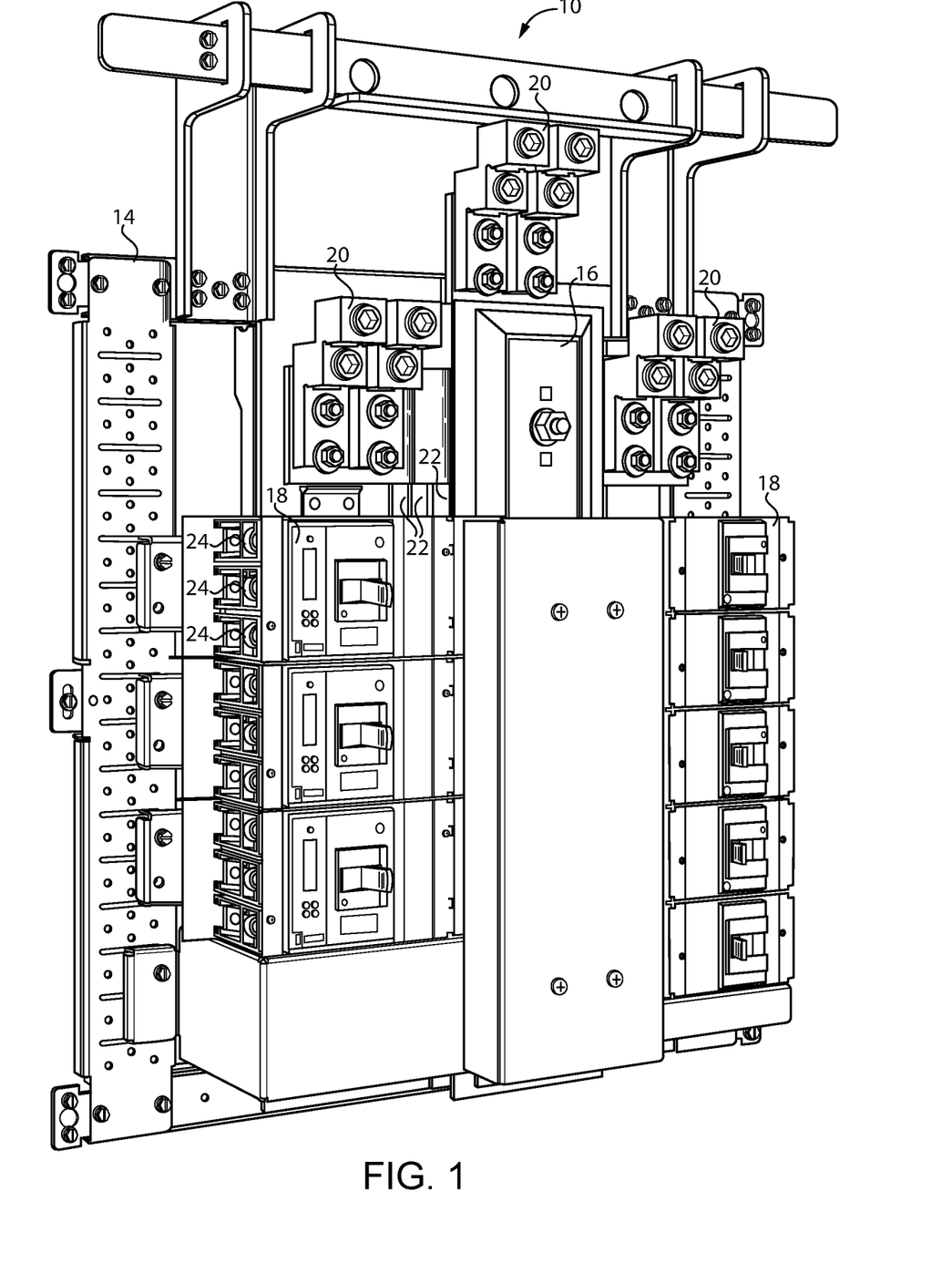
FIG. 1 is a perspective view of the internal portion of a power supply panel.
Figure 2:
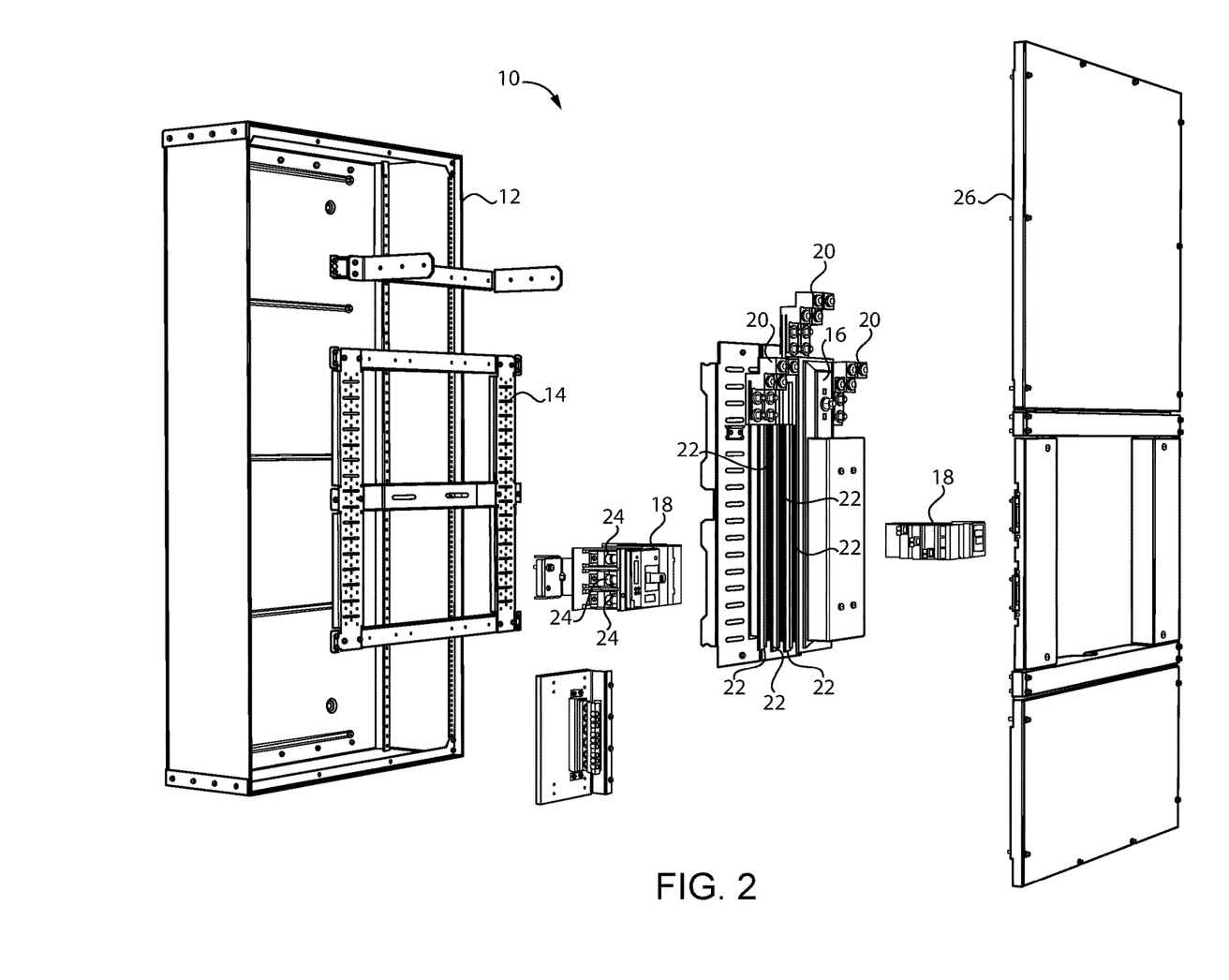
FIG. 2 is an exploded view of the power supply panel.

Typically, industrial facilities are provided with one or more power supply panels 10 to distribute electrical power throughout the industrial facility. An example of a power supply panel 10 is shown in FIGS. 1-2. As shown, the panel 10 includes an electrical box 12. Within the box 12, mounting structures 14 are also provided to mount a power supply bus 16 and a series of circuit breakers 18. Power is supplied to the bus 16 with one or more lugs 20 which are connected to electrical power supply cables and to the bus 16. The circuit breakers 18 are electrically connected to the bus 16 with an electrical connector 34 described in more detail below. Electrical cables are also connected to each circuit breaker 18 to supply electrical power to various electrical circuits throughout the industrial facility. Commonly, the total electrical capability of the power supply panel (i.e., the bus 16) is required to be within 150 A to 1,200 A. It is understood that the box 12 may also contain a variety of other electrical accessories in addition to the power supply bus 16 and circuit breakers 18. Although the described arrangement may be used with a single phase system, the illustrated system is a three-phase system. Thus, three lugs 20 are provided to supply power; three connecting slots 22 are provided in the bus 16; and each circuit breaker 18 has three output connectors 24. A cover 26 is also typically provided to enclose the bus 16 and other electrical hardware within the box 12.

SUMMARY

A heat sink is provided that may be connected to a heat transfer contact of an electrical component. The electrical component may be a power supply bus that provides electrical power to a series of circuit breakers. The heat sink may be connected to the bus to remove heat which is generated by the electrical current supplied from the bus to the circuit breakers.

BRIEF DESCRIPTION OF SEVERAL VIEWS OF THE DRAWINGS

The invention may be more fully understood by reading the following description in conjunction with the drawings, in which.

DETAILED DESCRIPTION

Figure 9:
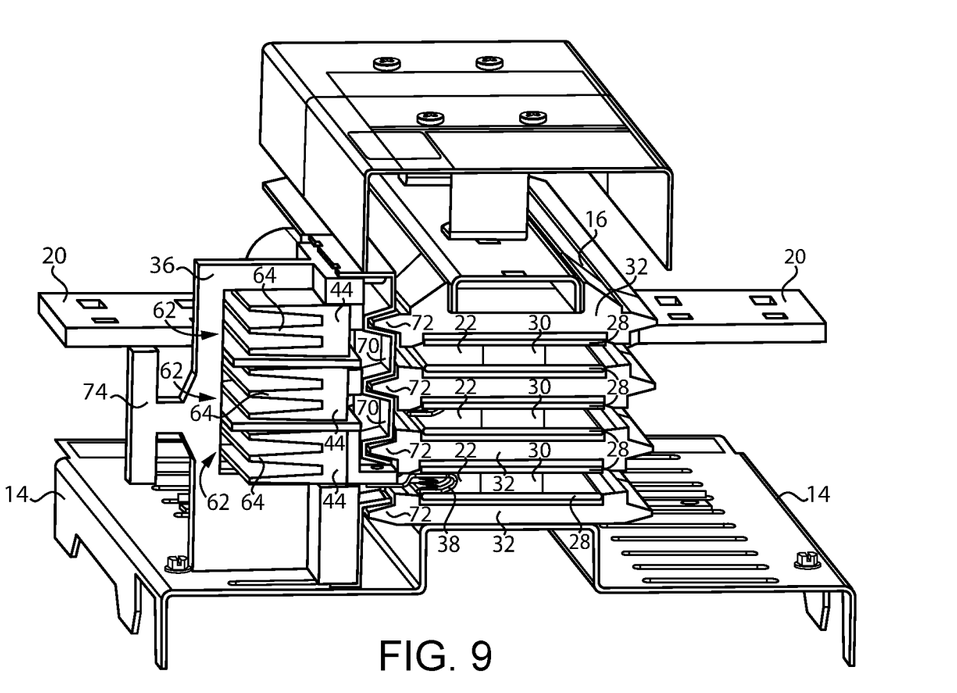
FIG. 9 is a cross-sectional view of the power supply bus and the three phase heat sink.

As shown in FIG. 1, the circuit breaker 18 and bus 16 are mounted to the base 14 of the box 12. As shown in FIG. 9, a three phase heat sink 36 may also be mounted to the base 14 of the box 12. It is understood that the heat sink 36 could also be designed as a single phase heat sink. As illustrated in the cross-section of FIG. 9, the power supply bus 16 is preferably a stacked arrangement with a connecting slot 22 (i.e., an opening 22) between two contact plates 28 for each phase. The contact plates 28 are separated from each other with a spacer 30. In high amperage applications, it is preferred that both contact plates 28 defining a slot 22 are made of a conductive material like copper and the spacer 30 therebetween is also conductive. It is understood that other electrically conductive materials may also be used including, for example, aluminum. However, it may be possible in lower amperage applications for only one of the two plates 28 to be conductive and for the spacer 30 and the other plate 28 to be made of an insulative material. On the top and bottom of each plate 28, an insulated plate 32 is preferably provided. The insulated plate 32 may be made of fiber reinforced plastic. As shown, the insulated plates 32 preferably include an extension portion 72 that extends outward beyond the respective plate 28 and covers a portion of the respective connector 34, 38.

Figure 3:
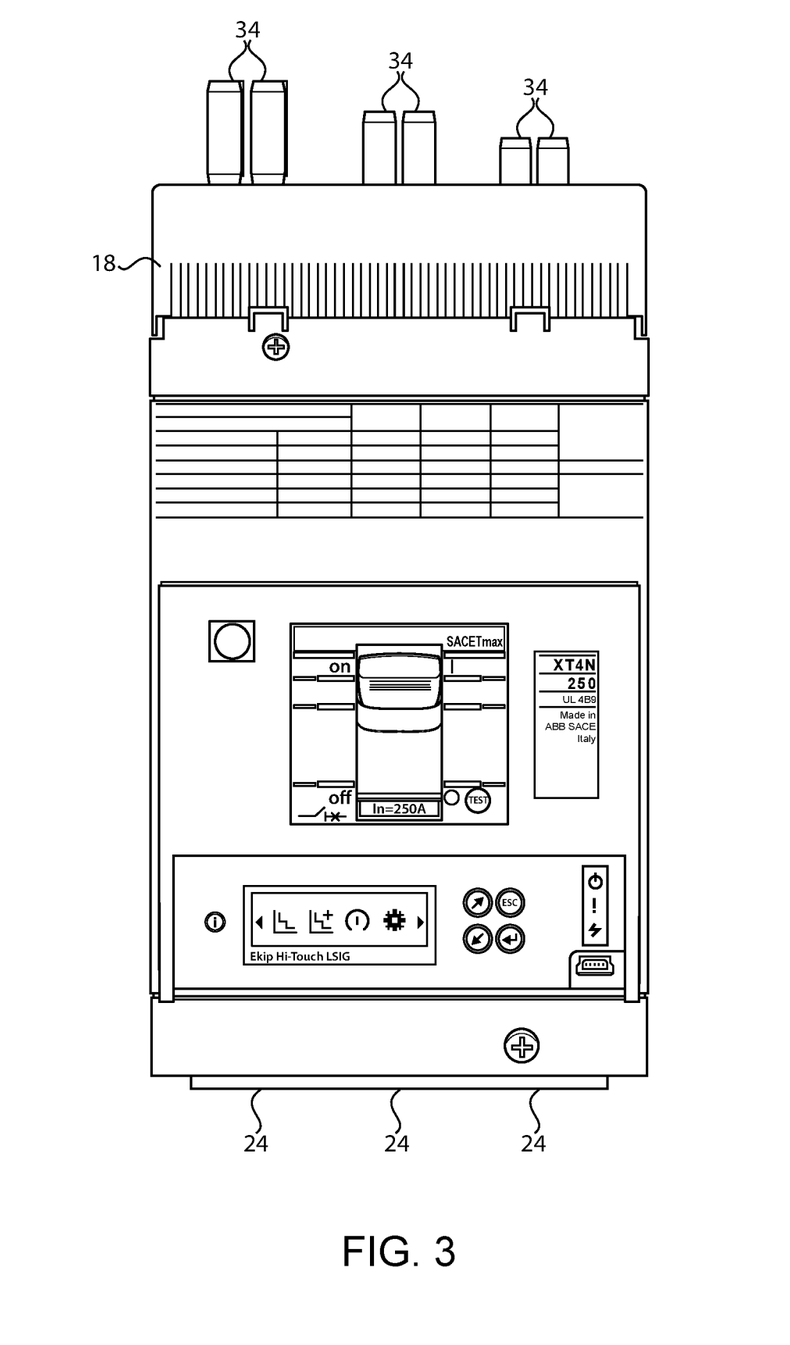
FIG. 3 is a front view of a circuit breaker.
Figure 4:
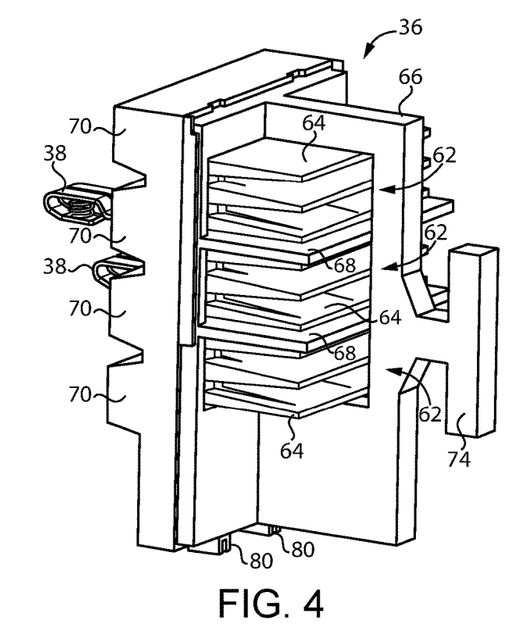
FIG. 4 is a rear perspective view of a three phase heat sink.
Figure 6:
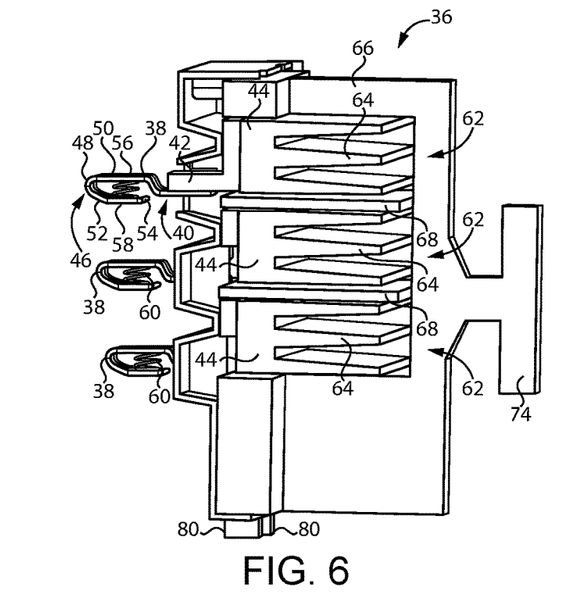
FIG. 6 is a cross-sectional view of the three phase heat sink.

As illustrated in FIGS. 3 and 6, it may be desirable for the circuit breakers 18 and heat sinks 36 to utilize the same connectors 34, 38 for connecting the circuit breakers 18 and heat sinks to the bus 16. As shown in FIG. 6, the connectors 34, 38 are rigidly attached at a second end 40 to a bar 42. In the case of the circuit breaker 18, the bar is electrically connected to the switching mechanism within the breaker 18. In the case of the heat sink 36, the bar 42 is thermally connected to a heat sink base 44. It is understood that the bar 42 and the base 44 could be integrated if desired. As shown in FIG. 9, the first end 46 of the connector 34, 38 slides into the connection slot 22 in the power supply bus 16 in order to electrically connect the circuit breaker 18 to the bus 16 and thermally connect the heat sink 36 to the bus 16. Although various connectors are possible, the preferred connector 34, 38 illustrated in FIG. 6 has a first end 46 with a bend 48 between two arms 50, 52 of the connector 34, 38, with the first arm 50 defining the second end 40 of the connector 34, 38 and the second arm 52 defining a free end 54 of the connector 34, 38. First and second contact portions 56, 58 are located between the bend 48 and the second end 40 and the free end 54, respectively. When the connectors 34, 38 are inserted into the bus 16, the first and second contact portions 56, 58 are compressed against each other by the plates 28. The connectors 34, 38 may also have a spring 60 that engages the first and second arms 50, 52 to bias the first and second contact portions 56, 58 away from each other. For instance, the spring 60 may be a coil spring located between the first and second arms 62, 64. Desirably, the first and second arms 50, 52 of the connector 34, 38 are made of copper while the spring 60 is made of steel. It is understood that various types of bus designs and connector designs may also be used if desired.

Figure 5:
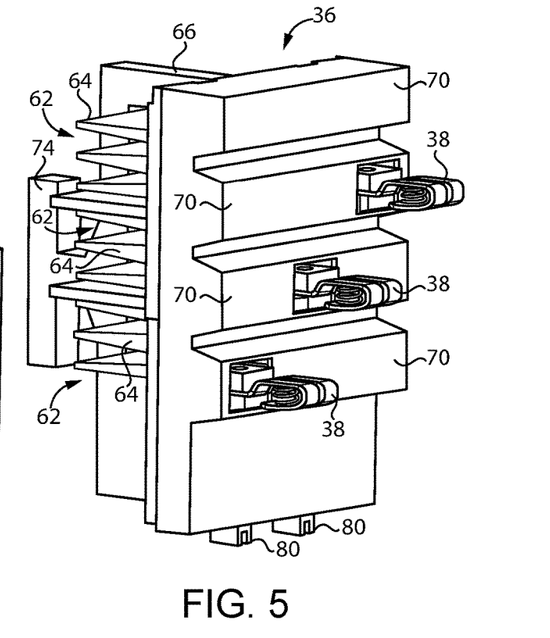
FIG. 5 is a front perspective view of the three phase heat sink.
Figure 7:
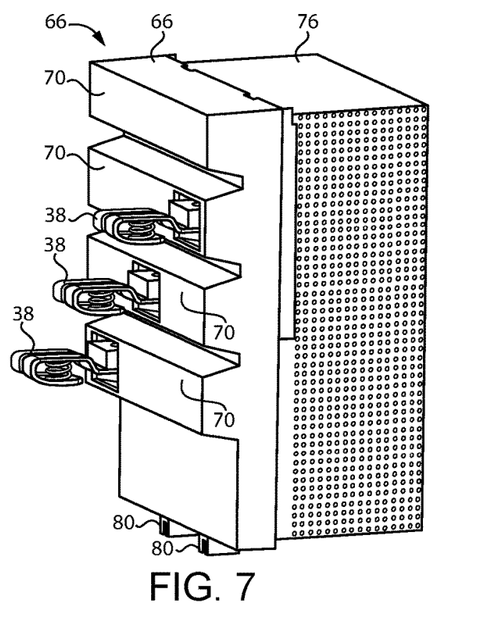
FIG. 7 is a front perspective view of another three phase heat sink.

In the illustrated figures, three electrical connectors 34, 38 are provided between the bus 16 and the circuit breaker 18 and between the bus 16 and the heat sink 36, since the illustrated system is a three-phase system. Alternatively, in a single phase system, there could be only one connector 34, 38 between the bus 16 and the circuit breaker 18 and between the bus 16 and the heat sink 36. As shown in FIG. 6, the three phase heat sink 36 includes three separate heat sinks 62. Each of the heat sinks 62 may have a base 44 and a plurality of heat dissipating structures 64 connected to the base 44. As shown, the heat dissipating structures 64 may take the form of fins 64 extending outward from the base 44. As shown, the base 44 and fins 64 may be a single, integrated component. Preferably, the base 44 and fins 64 are made of aluminum. The bar 42 connected to the base 44 and the connector 38 may be made of copper or aluminum. Where the heat sink 36 is a three-phase heat sink 36, the connectors 38 for each of the heat sink phases 62 are preferably all the same as each other. That is, the connectors 38 are interchangeable with each other and are matching components. Also, each of the connectors 38 extend out from the heat sinks 62 the same distance to equally engage the bus 16. As shown in FIGS. 5 and 7, the connectors 38 for each phase may be longitudinally offset from each other to provide additional electrical isolation and spread out the contact force with the bus 16 longitudinally.

Preferably, the components of the heat sink 36, 62 draw heat generated by electric current flowing through the power supply bus 16 away from the bus 16 in order to dissipate the heat to the surrounding air. That is, heat flows from the contact plates 28, through the connector 38, to the bar 42 and base 44, and to the fins 64 where the heat is transferred to the surrounding air. In such an arrangement, it is preferable that the connector 38, bar 42, base 44 and fins 64 be made of metal. Where the components of the heat sink 36, 62 are made of an electrically conductive material (e.g., the connector 38 being made of metal) and electric current is flowing through the contact plates 28 of the base 16, this means that the connector 38, bar 42, base 44 and fins 64 will be electrically charged, although the intended contact with the bus 16 is only to dissipate heat therefrom. In a three-phase heat sink 36, this means that each of the individual heat sinks 62 will be electrically charged by a different electrical phase. Thus, it is undesirable for there to be any electrical connection between the individual heat sinks 62. Therefore, it is preferable for the individual heat sinks 62 to be connected together by a housing 66 which electrically isolates the individual heat sinks 62 from each other. Further, an insulative barrier 68 may be provided between the bars 42, bases 44 and fins 64 of the respective heat sinks 62.

Figure 8:
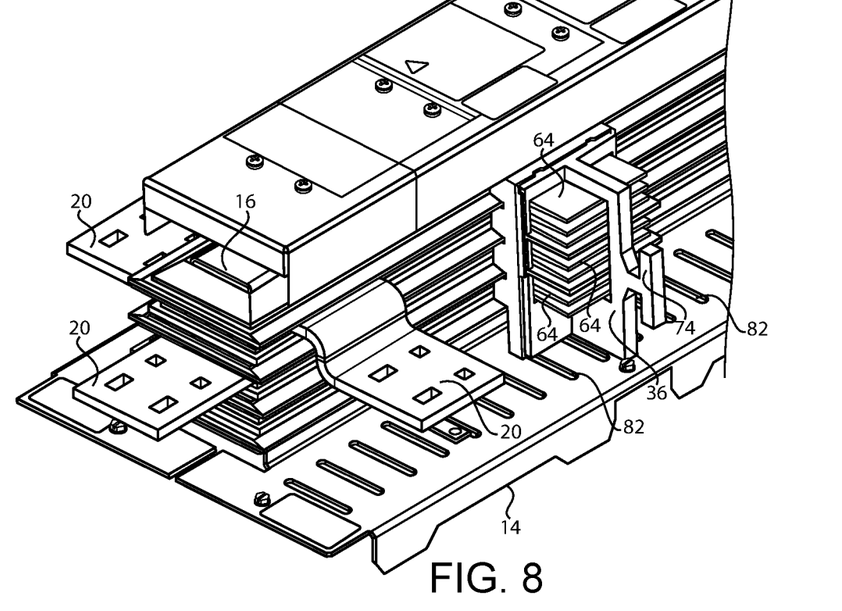
FIG. 8 is a perspective view of a power supply bus with the three phase heat sink connected thereto.

As shown in FIGS. 5 and 7, it may also be desirable to provide the housing 68 with insulated extension portions 70 that extend outward toward the connectors 38. As shown in FIG. 9, this allows the extension portions 72 of the bus 16 to overlap with the extension portions 70 of the heat sink 36. As shown, the extension portion 70 of one phase of the heat sink 36 may be inserted between two extension portions 72 of the bus 16. This provides improved electrical isolation between the connectors 38 of the different phases and may prevent electrical contact with foreign objects. As shown in FIGS. 4-7, the heat sink 36 may also be provided with one or more projections 80 on the bottom which are inserted into slots 82 in the mounting structure 14 (FIG. 8) in order to securely mount the heat sink 36.

As also shown in FIG. 9, it may be desirable to provide the heat sink 36 with an insulated handled 74 so that the heat sink 36 may be grasped to connect the heat sink 36 to the bus 16 without the user coming into contact with the electrified bus 16 and heat sink 36. As shown in FIG. 7, it may also be desirable to provide the housing 66 with an insulated shield 76 that surrounds the fins 64 to prevent foreign objects from contacting the electrically charged fins 64. Preferably, the shield 76 is perforated to allow airflow therethrough to allow air to flow through the fins 64 in order to cool the heat sinks 62.

Figure 10:
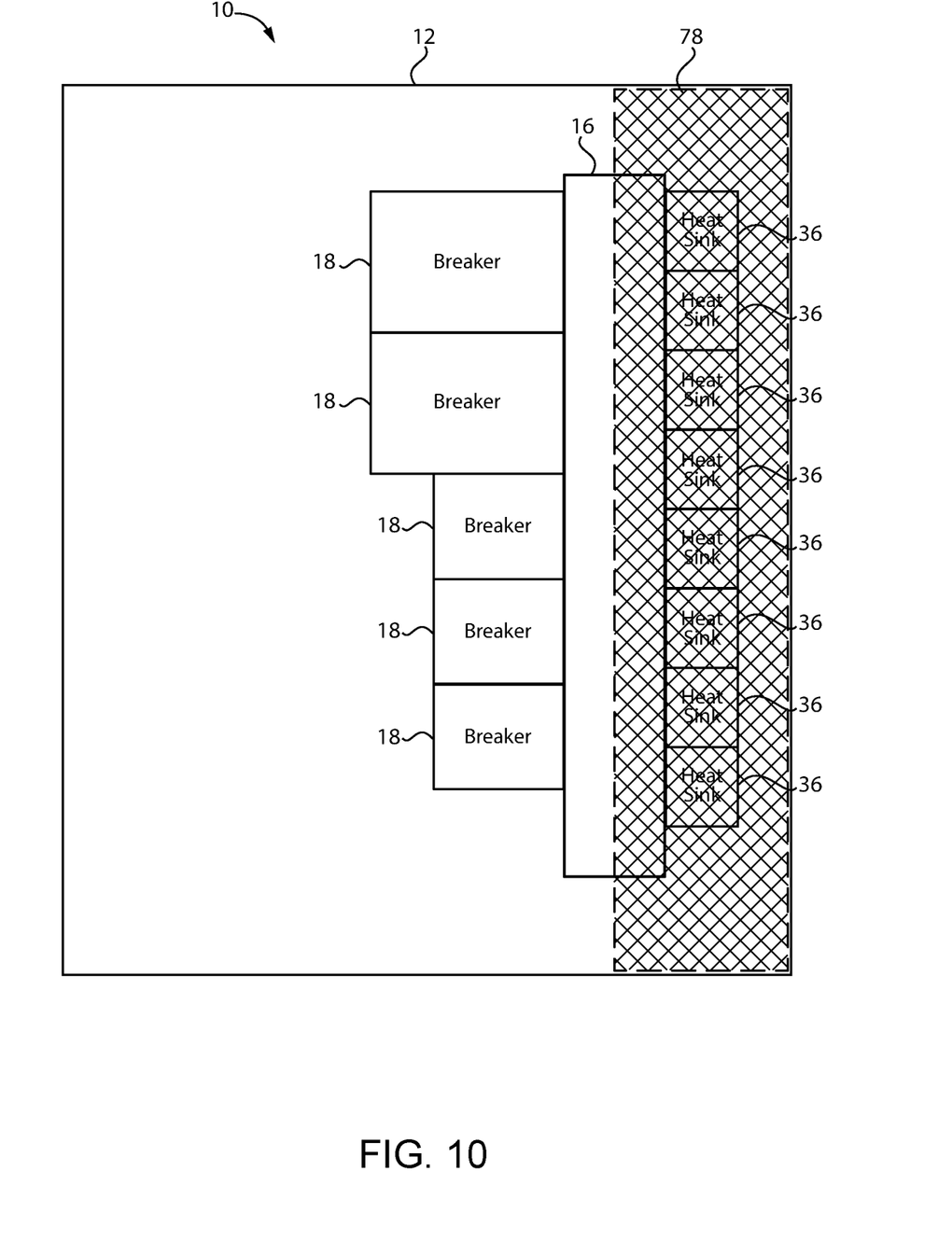
FIG. 10 is a schematic view of a power supply panel.

Although it is possible for the circuit breakers 18 and heat sinks 36 to be connected to the same side of the bus 16 and to be connected side-by-side, FIG. 10 shows an embodiment where the circuit breakers 18 are connected to one side of the bus 16 and heat sinks 36 are connected to the other side of the bus 16. Since it is possible for the heat sinks 36 to be smaller in size compared to the circuit breakers 18, in this embodiment it may be desirable for the bus 16 to be mounted off-center in the electrical box 12. Thus, in this arrangement, the circuit breakers 18 may be connected to the side of the bus 16 with greater space, and the heat sinks 36 may be connected to the side of the bus 16 with less space. Also, it may be desirable to provide a screen 78 over the side of the bus 16 and/or box 12 that the heat sinks 36 are connected to. Since regular access to the heat sinks 36 is not typically needed (as compared to the circuit breaker 18 where access to the switch is needed), the screen 78 may cover multiple heat sinks 36 and be attached to the bus 16 or box 12. Thus, the screen 78 prevents inadvertent contact with the electrically charged heat sinks 36. Preferably, the screen 78 is perforated to allow airflow therethrough for cooling of the heat sinks 36.

While preferred embodiments of the inventions have been described, it should be understood that the inventions are not so limited, and modifications may be made without departing from the inventions herein. While each embodiment described herein may refer only to certain features and may not specifically refer to every feature described with respect to other embodiments, it should be recognized that the features described herein are interchangeable unless described otherwise, even where no reference is made to a specific feature. It should also be understood that the advantages described above are not necessarily the only advantages of the inventions, and it is not necessarily expected that all of the described advantages will be achieved with every embodiment of the inventions. The scope of the inventions is defined by the appended claims, and all devices and methods that come within the meaning of the claims, either literally or by equivalence, are intended to be embraced therein.

The invention claimed is:

1. A heat sink connectable to an electrical component, the electrical component comprising a heat transfer contact, and the heat sink comprising:
    a plurality of heat dissipating structures;
    a base connected to the plurality of heat dissipating structures; and
    a connector attached to the base and transferring heat from the heat transfer contact of the electrical component to the base of the heat sink;
    wherein the heat transfer contact is defined by an opening in the electrical component, the connector of the heat sink comprising first and second contact portions, the first contact portion being biased against a first side of the opening, and the second contact portion being biased against a second side of the opening.

2. The heat sink according to claim 1, wherein the connector comprises a bend disposed within the opening, and further comprising first and second arms connected to opposite ends of the bend, the first arm comprising the first contact portion and being attached to the base, and the second arm comprising the second contact portion and a free end, the first contact portion being disposed between the bend and the base, and the second contact portion being disposed between the bend and the free end.

3. The heat sink according to claim 2, further comprising a spring disposed between the first and second arms and biasing the first and second contact portions away from each other.

4. The heat sink according to claim 3, wherein the bend and the first and second arms are made of copper and the spring is made of steel.

5. The heat sink according to claim 1, wherein the opening of the electrical component is a space between two parallel plates, the two parallel plates defining the first and second sides of the opening.

6. The heat sink according to claim 5, wherein the electrical component is a power supply bus with an insulated plate disposed over at least one of the parallel plates, the insulated plate comprising a first insulated extension portion extending outward beyond the parallel plate.

7. The heat sink according to claim 6, further comprising a second insulated extension portion attached to the heat sink, where the first and second insulated extension portions overlap each other when the heat sink is connected to the electrical component.

8. The heat sink according to claim 1, further comprising an insulated handle for grasping the heat sink and connecting the connector to the electric component.

9. The heat sink according to claim 1, further comprising a perforated insulated shield connected to the heat sink and surrounding the plurality of heat dissipating structures.

10. The heat sink according to claim 1, wherein the plurality of heat dissipating structures are air cooled fins.

11. A heat sink according to claim 1, connectable to an electrical component, the electrical component comprising a heat transfer contact, and the heat sink comprising:
    a plurality of heat dissipating structures;
    a base connected to the plurality of heat dissipating structures; and
    a connector attached to the base and transferring heat from the heat transfer contact of the electrical component to the base of the heat sink;
    wherein the plurality of heat dissipating structures are air cooled fins; and
    wherein the electrical component is a power supply bus, the heat transfer contact being an electrical contact.

12. The heat sink according to claim 11, wherein the connector, the base and the plurality of heat dissipating structures are made from electrically conductive material such that the connector, the base and the plurality of heat dissipating structures are electrically charged when the heat sink is connected to the power supply bus.

13. A three phase heat sink comprising three of the heat sink according to claim 11, wherein the power supply bus is a three phase power supply bus comprising three of the electrical contact wherein each of the electrical contacts is for one of the phases, and the three heat sinks are connected together by a housing, the housing electrically isolating the three heat sinks from each other.

14. The three phase heat sink according to claim 13, further comprising an insulative barrier between the plurality of heat dissipating structures of each of the heat sinks.

15. The three phase heat sink according to claim 13, wherein each of the connectors of the heat sinks are the same as each other.

16. The three phase heat sink according to claim 15, wherein each of the connectors of the heat sinks extends outward from the three phase heat sink an equal distance.

17. The three phase heat sink according to claim 13, wherein each of the connectors of the heat sinks are longitudinally offset from each other along a length of the power supply bus.

18. A power supply panel comprising the heat sink according to claim 1, and further comprising:
    the electrical component, wherein the electrical component is a power supply bus comprising one or more of the heat transfer contacts, the one or more of the heat transfer contact being one or more electrical contacts;
    a circuit breaker connected to the one or more electrical contacts; and
    the heat sink connected to the one or more electrical contacts.

19. The power supply panel according to claim 18, wherein the one or more electrical contacts comprises an opening in the power supply bus and two parallel plates defining first and second sides of the opening.

20. The power supply panel according to claim 18, wherein the circuit breaker comprises a circuit breaker connector connected to the one or more electrical contacts, and the circuit breaker connector is interchangeable with the connector of the heat sink.

21. A power supply panel comprising a heat sink connectable to an electrical component, the electrical component comprising a heat transfer contact, and the heat sink comprising:
    a plurality of heat dissipating structures;
    a base connected to the plurality of heat dissipating structures; and
    a connector attached to the base and transferring heat from the heat transfer contact of the electrical component to the base of the heat sink;
and further comprising:
    the electrical component, wherein the electrical component is a power supply bus comprising one or more of the heat transfer contacts, the one or more of the heat transfer contact being one or more electrical contacts;
    a circuit breaker connected to the one or more electrical contacts; and
    the heat sink connected to the one or more electrical contacts;
    wherein the power supply bus is disposed off-center within an electrical box, the circuit breaker being connected to one side of the power supply bus having greater space, and the heat sink being connected to another side of the power supply bus having less space.

22. A power supply panel comprising a heat sink connectable to an electrical component, the electrical component comprising a heat transfer contact, and the heat sink comprising:
    a plurality of heat dissipating structures;
    a base connected to the plurality of heat dissipating structures; and
    a connector attached to the base and transferring heat from the heat transfer contact of the electrical component to the base of the heat sink;
and further comprising:
    the electrical component, wherein the electrical component is a power supply bus comprising one or more of the heat transfer contacts, the one or more of the heat transfer contact being one or more electrical contacts;
    a circuit breaker connected to the one or more electrical contacts; and
    the heat sink connected to the one or more electrical contacts;

wherein the circuit breaker is connected to one side of the power supply bus and the heat sink is connected to another side of the power supply bus, and further comprising a perforated screen overlying the another side of the power supply bus to shield the heat sink.

23. The heat sink according to claim 12, further comprising a perforated insulated shield connected to the heat sink and surrounding the plurality of heat dissipating structures.

\* \* \* \* \*